US009043120B2

(12) United States Patent
Nack et al.

(10) Patent No.: US 9,043,120 B2
(45) Date of Patent: May 26, 2015

(54) METHOD FOR OPERATING AN INTERNAL COMBUSTION ENGINE

(75) Inventors: Laurent Nack, Stuttgart (DE); Ruediger Weiss, Moetzingen (DE); Haris Hamedovic, Moeglingen (DE); Wolfgang Fischer, Gerlingen (DE); Silke Seuling, Remseck/Neckar (DE); David Gaenzle, Leinfelden-Echterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 447 days.

(21) Appl. No.: 13/462,016

(22) Filed: May 2, 2012

(65) Prior Publication Data

US 2012/0296554 A1 Nov. 22, 2012

(30) Foreign Application Priority Data

May 16, 2011 (DE) ........................ 10 2011 075 907
Nov. 28, 2011 (DE) ........................ 10 2011 087 199

(51) Int. Cl.

*G06F 17/00* (2006.01)
*F02D 41/30* (2006.01)
*F02D 41/24* (2006.01)
*F02D 41/06* (2006.01)

(52) U.S. Cl.

CPC .......... *F02D 41/2467* (2013.01); *F02D 41/068* (2013.01); *F02D 41/248* (2013.01); *F02D 2200/0602* (2013.01); *F02D 2200/101* (2013.01); *F02D 2200/1012* (2013.01)

(58) Field of Classification Search

USPC .......................................... 701/101-105, 113
See application file for complete search history.

(56) References Cited

U.S. PATENT DOCUMENTS

| | | | | |
|---|---|---|---|---|
| 6,810,855 | B2 * | 11/2004 | Hasegawa et al. | 123/445 |
| 6,947,827 | B2 * | 9/2005 | Fuse et al. | 701/110 |
| 7,565,238 | B2 * | 7/2009 | Nakagawa et al. | 701/113 |
| 2004/0149268 | A1 * | 8/2004 | Hasegawa et al. | 123/478 |
| 2005/0205057 | A1 * | 9/2005 | Yamashita | 123/406.58 |
| 2006/0000442 | A1 * | 1/2006 | Carlton et al. | 123/357 |
| 2011/0180039 | A1 * | 7/2011 | Nada | 123/445 |

FOREIGN PATENT DOCUMENTS

DE 10 2007 013 460 11/2007

* cited by examiner

*Primary Examiner* — Hieu T Vo
*Assistant Examiner* — Arnold Castro
(74) *Attorney, Agent, or Firm* — Kenyon & Kenyon LLP

(57) ABSTRACT

A method for operating an internal combustion engine in which a speed-based feature of the internal combustion engine, which is correlated with an indicated mean effective pressure of the fuel, is determined during the warm-up of the internal combustion engine and an ideal fuel quantity, which is to be injected into at least one combustion chamber of the internal combustion engine during the warm-up, is ascertained therefrom.

23 Claims, 2 Drawing Sheets

METHOD FOR OPERATING AN INTERNAL COMBUSTION ENGINE

RELATED APPLICATION INFORMATION

The present application claims priority to and the benefit of German patent application no. 10 2011 075 907.7, which was filed in Germany on May 16, 2011, and German patent application no. 10 2011 087 199.3, which was filed in Germany on Nov. 28, 2011, the disclosures of which are incorporated herein by reference.

FIELD OF THE INVENTION

The present invention relates to a method and a system for operating an internal combustion engine.

BACKGROUND INFORMATION

In a driving cycle of a motor vehicle, an considerable portion of the hydrocarbon emissions is generated during the warm-up of the internal combustion engine. One of the reasons for that is that the catalytic converter in an exhaust system of the motor vehicle is not sufficiently converted at the beginning of the warm-up so that the emissions are not cleaned or cleaned only insufficiently by the catalytic converter during the warm-up. For this reason, optimizing the warm-up is of interest. For this purpose, operating parameters may be controlled during the warm-up, assuming, however, that the operating parameters to be controlled may be measured.

In this context, a method for checking an air mass sensor for an internal combustion engine is discussed in the publication DE 10 2007 013 460 A1. A cylinder pressure is determined in this case and used for ascertaining an indicated mean effective pressure. The indicated mean effective pressure is used together with a thermal efficiency to determine a fuel quantity to be injected. Furthermore, the oxygen quantity and the air mass are determined at least in a stationary case from a lambda value, which describes an oxygen/fuel quantity ratio, and from the fuel quantity, and the determined air mass is compared to an air mass measured by an air mass sensor.

SUMMARY OF THE INVENTION

Against this background, a method and a system having the features of the independent patent claims are presented. Further embodiments of the present invention result from the description herein.

In one embodiment of the method according to the present invention, an ideal quantity, generally a setpoint quantity, of fuel which is to be injected into at least one combustion chamber of an internal combustion engine for an injection to be carried out is ascertained during the warm-up. Here, an ideal injection time or setpoint injection time which is to be applied to an injector of an injection system may be ascertained, so that the provided ideal fuel quantity is injected. In the method, a speed-based feature of the internal combustion engine, which is correlated with an indicated mean effective pressure, is determined or calculated; the fuel quantity may, in turn, be ascertained therefrom. The ideal quantity of fuel to be injected is ascertained on the basis of a characteristic of the speed-based feature over the injected quantity.

The ideal quantity provided here is sufficient for a robust operation of the internal combustion engine, but not too large so that hydrocarbon emissions, which result from uncombusted fuel, are not increased.

The ideal quantity to be ascertained in one embodiment of the method is injected when a certain lambda value for an air/fuel mixture is reached. The lambda value $\lambda$ indicates an air/fuel ratio, which is measured by a lambda sensor situated in an exhaust system, in comparison to a stoichiometric ratio in which the fuel is completely combusted and the lambda value is $\lambda=1$. If the lambda value is $\lambda>1$, the air/fuel mixture is lean and there is an air surplus. In a rich air/fuel mixture, there is a fuel surplus so that the lambda value is $\lambda<1$. The method makes it possible for an appropriate lambda value for the warm-up of the internal combustion engine to be reached if the provided ideal fuel quantity is injected into at least one combustion chamber.

In one specific embodiment of the method, it is taken into account that a lambda sensor does not have the necessary operating temperature during the warm-up, so that a lambda signal for providing a lambda value is not yet available. A majority of the hydrocarbon exhaust emissions originates during the warm-up phase since the catalytic converter is not converted yet after a start; this means that the emissions upstream and downstream from the catalytic converter are identical.

For this reason, in one embodiment of the method, the ideal quantity of fuel to be injected is indirectly ascertained with the aid of an appropriate speed feature and thus via a speed-based feature which has a great correlation with an indicated mean effective pressure (pmi, indicated mean effective pressure). The speed-based feature is usually determined with the aid of a measurement and/or a calculation, and the quantity of fuel to be injected is ascertained therefrom. This may mean that the ideal quantity of fuel to be injected and thus the injection quantity are ascertained with the aid of a tooth time-based speed analysis during the warm-up of the internal combustion engine. Thus, it is usually possible to ensure a robust combustion and at the same time less exhaust gas emissions during the warm-up.

To determine the speed-based feature, a speed of a crankshaft or a crank drive of the internal combustion engine is measured by an engine speed sensor of the internal combustion engine. Angular velocity $d\phi/dt$, which is coupled to the speed, may furthermore be derived and/or calculated and thus determined from the speed. It is, however, also possible to determine a rotational angle $\phi$ or an angular velocity $d\phi/dt$ using a rotational angle sensor. The speed-based feature may be determined as a function of the speed or angular velocity $d\phi/dt$ of the rotational angle. A possible speed-based feature is the kinetic energy of rotation which is proportional to the square of the time derivative of the rotational angle of the crankshaft or the crank drive.

A previously applied value, which is a function of the load, the speed, the temperature of the internal combustion engine and/or the number of combustions since the end of a start, for example, is used as the initial value for a quantity to be injected. Furthermore, a lean operation of the internal combustion engine may be set ($\lambda>1$) by the initial value.

In one possible embodiment of the method, values for the speed-based feature resulting for different values for a quantity of injected fuel, which result for different injection times, may be ascertained and stored. A characteristic of the speed-based feature, which may be curved, may be furthermore determined from the values for the speed-based feature ascertained in this way. To determine the ideal quantity of fuel to be injected, the characteristic and/or a derivative of this characteristic, which is usually curved, may be checked according to the quantity of injected fuel or according to the injection time.

During an analysis of the derivative it may be checked where it has a threshold value, i.e., for what value of the injected quantity a value of the derivative corresponds to this threshold value. Since the values for the characteristic as well as the values resulting therefrom for the derivative of the characteristic are ascertained during the operation, it may be checked for what value of the injected quantity a value for the derivative of the characteristic reaches, e.g., falls below, the threshold value, since a slope of the characteristic typically decreases with an increasing quantity of injected fuel starting from the initial value, and values for the derivative of the characteristic are thus reduced until the setpoint value is reached. The characteristic of the speed-based feature may be a continuous and/or a smooth curve which may have a kink in one embodiment, the kink representing the ideal fuel quantity to be injected in which a value of the derivative of the characteristic corresponds to the threshold value.

To ascertain the ideal quantity of fuel to be injected, it is provided in one specific embodiment of the method according to the present invention to, for example incrementally, increase the quantity of injected fuel starting from the mentioned initial value, which causes a lean air/fuel mixture, to detect the characteristic of the speed-based feature as well as to check the characteristic and/or its derivative, this feature possibly being a function of the speed, the rotational angle or an angular velocity of the crankshaft or the crank drive, and being correlated with the mean effective pressure. The injected fuel quantity is increased until the derivative reaches the threshold value and the characteristic has the specified kink at which the ideal injection time is present and/or at which the ideal injection time is set. At the kink, the characteristic or an appropriate curve usually reaches a maximum, with minimum fuel quantity being injected. After that, the quantity may be further increased for a defined number of steps, an increase of this type not resulting in another increase of the speed-based feature at least during the warm-up.

If the characteristic of the speed-based feature has the aforementioned kink, the ideal fuel quantity to be reached per injection is injected at the set ideal injection time and a complete air quantity of the air/fuel mixture is combusted. It may be provided that in one embodiment of the method, the injection time and thus a quantity of the injected fuel resulting therefrom is varied. For every value used for the quantity of injected fuel, a value for the speed-based feature results, a quantity-dependent characteristic being determined therefrom for the speed-based feature. This characteristic is checked, the kink being able to be demonstrated along the characteristic. An injected fuel quantity, for which the kink results in the characteristic of the speed-based feature, is the ideal quantity to be ascertained of fuel to be injected. Furthermore, a maximum torque is reached for the internal combustion engine at least during the warm-up. If an injection time, which is longer than the ideal injection time, should be set so that a larger fuel quantity is injected, no further increase in the torque is caused.

If the ideal injection time is reached, a desired target value, which may be specified by emission guidelines required by law, etc., depending on the properties of the internal combustion engine, e.g., of its swept volume, is also present for the lambda value of the air/fuel mixture.

The characteristic of the speed-based feature or an appropriate characteristic curve of the speed-based feature may have a kink, which is recognizable by a flattening of the slope of the characteristic, if the characteristic asymptotically approaches a maximum value for the speed-based feature, depending on the design of the internal combustion engine or a type of the combustion process to be carried out. One embodiment of the present invention involves specifying a threshold value for the slope, i.e., for the derivative of the characteristic, which results in the presence of the ideal injection time and/or the ideal quantity of injected fuel. The slope of the characteristic usually continuously decreases when the injection time is prolonged and/or the quantity of injected fuel is increased, the characteristic being able to asymptotically approach the maximum value for the speed-based feature. The threshold value, which indicates that the kink has been reached and/or is present in the characteristic, may be defined for the slope and/or the derivative of the characteristic. It is possible that the kink is a discontinuity of the derivative of the characteristic, so that the characteristic in the area of the kink is discontinuous.

It is, however, also possible that the characteristic is continuous and/or smooth in the area of the kink despite the kink, the derivative of the characteristic being constant in this case. In both cases, the kink may be defined by the threshold value of the slope and/or the derivative. In other embodiments of the present invention, multiple threshold values, which indicate that any desired lambda value has been reached, may also be defined for the slope.

The increase in the quantity of injected fuel is achieved by prolonging the injection time. This prolongation of the injection time and the increase in quantity resulting therefrom may take place not only incrementally, but also, alternatively or additionally, according to an advantageously selected pattern, e.g., according to a constantly and/or continuously increasing function. The value of the injected quantity, usually of the ideal quantity at the threshold value of the derivative of the characteristic, e.g., at the kink of the characteristic of the speed-based feature, corresponds to a specified lambda value which is usually somewhat smaller than 1. Thus, when the kink is reached, a slightly rich fuel/air mixture is present.

Starting from this lambda value, the appropriate quantity of fuel to be injected may be calculated and set for a desired lambda value (setpoint lambda value). The ideal lambda value for the warm-up is specified within the scope of the application. This lambda value may also depend on various parameters, such as cooling water temperature, etc.

The fuel quantity injected into at least one combustion chamber, usually into at least one cylinder, of the internal combustion engine correlates under certain operating conditions, usually during a lean combustion, the injected fuel quantity being reliably, completely combusted directly with the indicated mean effective pressure (pmi) and the speed-based feature for mechanical and/or rotatory work (mwf, mechanical work feature) of the particular combustion chamber. The indicated mean effective pressure represents a measure for the work performed by the particular combustion chamber and the energy converted during this process regarding the swept volume caused by the combustion. The indicated mean effective pressure pmi is defined as follows:

$$pmi=(V_h)^{-1}\int p(\phi)dV(\phi)$$

where $\phi$ represents the rotational angle of the crankshaft or the crank drive of the internal combustion engine, p represents the pressure of the air/fuel mixture, V represent the volume and $V_h$ represents the swept volume of a combustion chamber designed in the form of a cylinder. Furthermore, it is taken into account whether the indicated mean effective pressure is calculated for an entire working cycle or only for the high-pressure and/or low-pressure loop(s), which may be taken into account by appropriately specifying the integration boundaries for determining the indicated mean effective pressure. To calculate the indicated mean effective pressure, one combustion chamber pressure sensor per cylinder is necessary.

If, however, no combustion chamber pressure sensor of this type may be made available, the provided speed-based feature may be used as an alternative. In this context, different approaches are conceivable, e.g., different tooth times or segment times may be used to determine the speed-based feature.

In one embodiment of the present invention, a value for mechanical work mwf is usually used as the speed-based feature, where:

$$mwf = 0.5((\theta(d\phi/dt)^2)|_{96°\ KWnZOT} - (\theta(d\phi/dt)^2)|_{TDC})$$

Θ represents the moment of inertia of the internal combustion engine which may be calculated from its geometry. dϕ/dt corresponds to the angular velocity of the crankshaft or the crank drive calculated from the tooth or segment times. Rotational angle ϕ and/or angular velocity dϕ/dt may be calculated from a speed of the crankshaft and the crank drive and may thus be determined, the speed being able to be measured using an engine speed sensor. It is, however, also possible to measure angular velocity dϕ/dt using a rotational angle sensor. In the embodiment described, product $\theta(d\phi/dt)^2$ represents a kinetic energy of a rotation of the crankshaft or the crank drive.

This kinetic energy of rotation $\theta(d\phi/dt)^2$ as the speed-based feature is ascertained and thus determined for a point in time prior to the combustion and following the combustion. Here, it is provided, for example, that the point in time prior to the combustion is reached when the crankshaft of the internal combustion engine reaches the top dead center (TDC). The point in time following the combustion results here when the crankshaft has a position of 96 degrees with regard to the top dead center (96° KWnZOT), for example. Regardless of at what points in time prior to and following the combustion the product $\theta(d\phi/dt)^2$ as speed-based feature is calculated, which indirectly depends on the measured speed and is proportional to the square of the angular velocity dϕ/dt, the energy difference of a rotation of the crankshaft or the crank drive prior to and following the combustion may be ascertained with the aid of the speed-based feature for mechanical work mwf.

Using the speed-based feature for mechanical work mwf, the work delivered under conversion of chemical energy into kinetic energy due to the combustion may be consequently determined with the aid of little calculating effort from the measured speed and an angular velocity dϕ/dt ascertainable therefrom. Since the speed-based feature for mechanical work mwf is correlated with indicated mean effective pressure pmi, it is possible to determine indicated mean effective pressure pmi from the speed-based feature for mechanical work mwf.

The system according to the present invention is configured to carry out all the steps of the presented method. Individual steps of this method may also be carried out by individual components of this system. Furthermore, functions of the system or functions of the individual components of the system, e.g., of the at least one control unit, may be implemented as steps of the method. In addition, it is possible to implement the steps of this method as functions of at least one component of the system or of the entire system.

Further advantages and embodiments of the present invention result from the description and the appended drawings.

It is understood that the above-named features to be elucidated below are usable not only in the given combination, but also in other combinations or by themselves without leaving the scope of the present invention.

DETAILED DESCRIPTION

Figure 1:
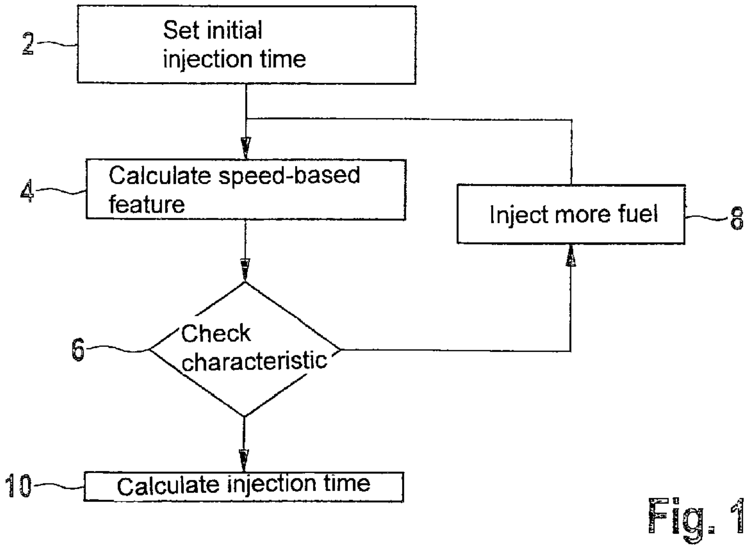
FIG. 1 shows a flow chart of a specific embodiment of the method according to the present invention.

The present invention is illustrated schematically on the basis of specific embodiments in the drawings and is described in greater detail in the following with reference to the drawings.

The figures are described contextually and comprehensively; identical reference numerals identify identical components.

The flow chart from FIG. 1 illustrates one specific embodiment of the method according to the present invention for operating an internal combustion engine in which an ideal fuel quantity, which is to be injected during one injection into at least one combustion chamber of the internal combustion engine, is ascertained during a warm-up of the internal combustion engine. A speed-based feature of the internal combustion engine, e.g., a kinetic energy of rotation of the crankshaft or a crank drive of the internal combustion engine, is determined, the speed-based feature being correlated with an indicated mean effective pressure of the fuel. To determine the speed-based feature, a speed and/or an angular velocity dϕ/dt of a crankshaft or a crank drive may be measured. Angular velocity dϕ/dt may also be derived from the speed. Furthermore, the speed-based feature, e.g., a kinetic energy of rotation, may be calculated using the speed or angular velocity dϕ/dt. The ideal quantity of fuel to be injected, which is ideal for the warm-up of the internal combustion engine, may be furthermore ascertained from the determined speed-based feature, usually from its characteristic.

In the specific embodiment of the method, in a first step 2, an initial value for the injection time, during which at least one injector is activated for injecting fuel into at least one combustion chamber, is applied and thus set as a value for an injection time of an injection to be carried out. By setting this value for the injection time provided as the initial value, a value for a fuel quantity to be injected, here an initial value for a first fuel quantity to be injected, is set at the same time, since this quantity is, inter alia, a function of the value of the injection time. The value, which is an initial value, for the quantity to be injected and/or the injection time per injection is furthermore a function of at least one operating parameter of the internal combustion engine, e.g., the speed, the load, the temperature, the fuel pressure and/or the number of combustions for the at least one combustion chamber.

In a second step 4, the speed-based feature, which is correlated with the indicated mean effective pressure (pmi), is calculated on the basis of the ascertained speed or, potentially, ascertained angular velocity dϕ/dt.

A characteristic of the speed-based feature, which may be a function of the speed or angular velocity dϕ/dt, is checked in a third step 6. In addition, a derivative from this characteristic may be formed according to the injection time and/or the injected quantity and may also be checked. During this process, it is checked whether a value of the derivative has reached a threshold value, which may mean that the characteristic of the speed-based feature has a kink, which may identify a maximum of the speed-based feature at a minimum injection time, for the instantaneously set value of the injection time and/or the injected quantity.

It is taken into account that different values of the speed-based feature result for different values of the injected fuel quantity. A value of the speed-based feature is assigned to a value of the injection time and a value of the injected quantity resulting therefrom. By varying the values of the injected quantity, different values of the speed-based feature are determined, and a characteristic of the speed-based feature dependent on the injection time and the quantity as well as its derivative may be determined therefrom. It may also be checked when a value of the derivative corresponds to the threshold value. This may mean that the kink may be demonstrated along the characteristic, the value of the injected quantity, whose characteristic has the kink, being ascertained as the value for the ideal quantity.

If the characteristic still has no kink when third step 6 is carried out and has thus not reached its maximum yet, the injection time is prolonged iteratively and thus incrementally and thus more fuel is injected in a fourth step 8.

Subsequently, the speed-based feature is recalculated when the second step 4 is repeated and its characteristic is checked for the presence of the kink in third step 6. In addition, a value of the derivative of the characteristic may also be calculated and compared to the threshold value.

If the threshold value for the derivative and/or the kink in the characteristic of the speed-based feature, which is correlated with the indicated mean effective pressure, is/are detected when third step 6 is carried out, the value of the injection time is not prolonged, but rather an ideal injection time, due to which it results during the warm-up that an ideal fuel quantity is injected, is calculated in a final fifth step 10. Thus, a quantity of fuel to be injected, which is ideal for the warm-up, may be ascertained via the threshold value of the derivative and/or via the kink in the characteristic of the speed-based feature determined by measurements and/or calculations.

Figure 2:
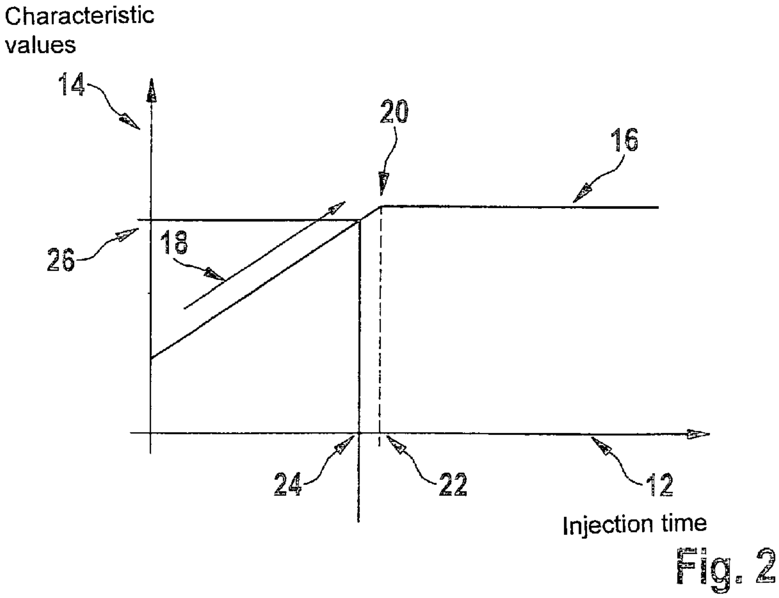
FIG. 2 shows a first diagram regarding a first operating parameter which is used in one specific embodiment of the method according to the present invention.

The diagram from FIG. 2 includes an abscissa 12, along which the values of an injection time for at least one injector are plotted, using which a quantity is set, which is to be injected into at least one combustion chamber of an internal combustion engine. Moreover, values for a characteristic 16 of a speed-based feature of the internal combustion engine, which is indicated by the indicated mean effective pressure, are plotted along an ordinate 14. Characteristic 16 of this speed-based feature depends on the injected fuel quantity and thus on the injection time.

During the warm-up of the internal combustion engine, the injection time is prolonged starting from an initial value for the injection time and thus for the quantity of injected fuel during lean combustion ($\lambda>1$) in at least one step, e.g., in fourth step 8 of the flow chart from FIG. 1, with a rise 18 of the speed-based feature resulting therefrom.

In one specific embodiment of the method according to the present invention, as illustrated with reference to the flow chart from FIG. 1, for example, the injection time is prolonged, and thus rise 18 of the speed-based feature takes place until its characteristic 16 has a kink 20 and thus a maximum is reached for the first time, characteristic 16 of the speed-based feature remaining constant in the present example even when the injection time is further prolonged or the characteristic rises to an at least smaller extent than before the kink.

In the presence of and/or when kink 20 is reached, an ideal injection time 22 is present, resulting in an ideal quantity of injected fuel. A so-called stoichiometric injection time 24, from which a stoichiometric quantity of injected fuel, at a lambda value $\lambda=1$, and a stoichiometric value 26 for the speed-based feature result, is indicated in the diagram for comparison purposes. Accordingly, it applies for ideal injection time 22 provided here that a rich air/fuel mixture having a lambda value $\lambda<1$ prevails. In this case, ideal injection time 22 ascertained here also corresponds to a maximum injection time, since the speed-based feature does not rise even in the case of an injection time which is longer than ideal injection time 22. Kink 20 may be defined via a threshold value of a derivative of characteristic 16. Kink 20, as shown in the diagram from FIG. 2, may be provided in the form of a discontinuity in characteristic 16 and thus a discontinuity of the slope or the derivative of characteristic 16. As soon as the slope of characteristic 16 reaches the threshold value, kink 20 is present in characteristic 16 for ideal injection time 22 to be reached.

Figure 3:
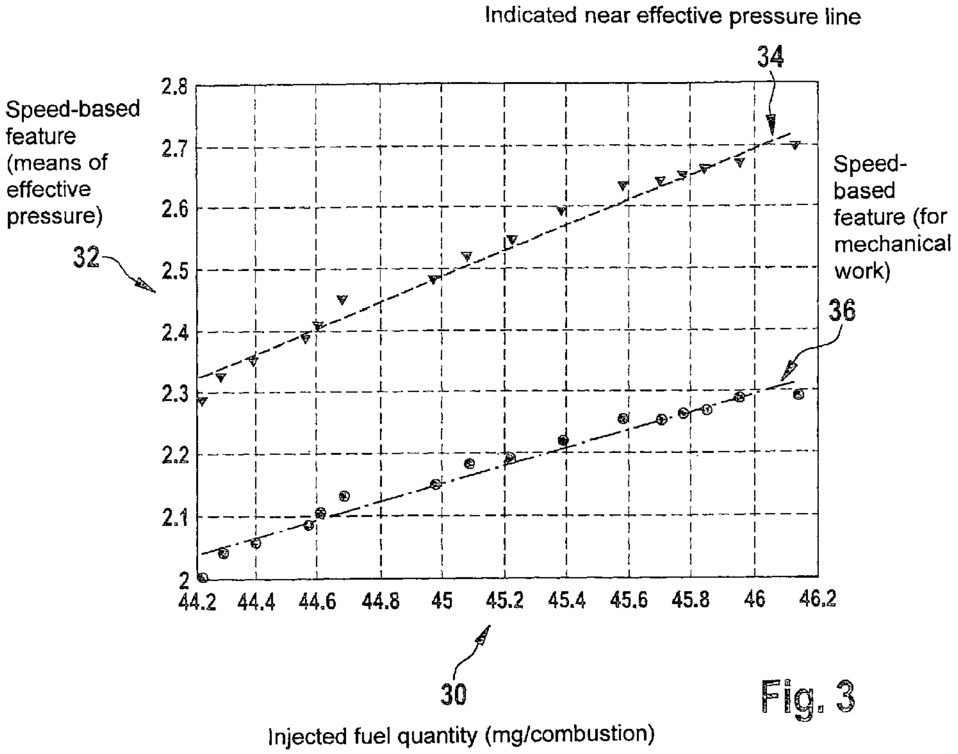
FIG. 3 shows a second diagram regarding other operating parameters which are used in one specific embodiment of the method according to the present invention.

In the diagram from FIG. 3, values for an injected fuel quantity into at least one combustion chamber of an internal combustion engine are plotted along an abscissa 30 in mg per combustion. Values for the indicated mean effective pressure are plotted using triangles and a first best fit straight line 34 along an ordinate 32 plotted above it. In addition, values for the speed-based feature for mechanical work during a combustion in the at least one combustion chamber are plotted along ordinate 32 using circles and a second best fit straight line 36. The diagram illustrates that, within the scope of the method, the qualitatively and/or quantitatively determinable speed-based feature for mechanical work and the indicated mean effective pressure are correlated as a function of the injected quantity and thus the injection time.

Figure 4:
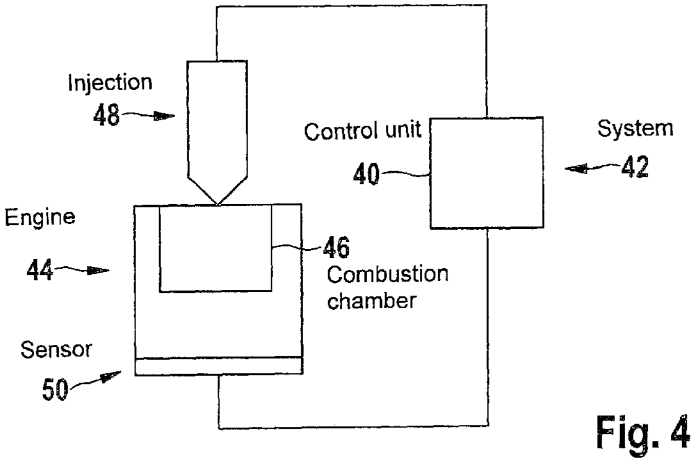
FIG. 4 shows a specific embodiment of a system according to the present invention.

FIG. 4 schematically shows a control unit 40 as the at least one component of a specific embodiment of a system 42 according to the present invention, and an internal combustion engine 44 of a motor vehicle, of which only one combustion chamber 46 in the form of a cylinder is illustrated in FIG. 4. Internal combustion engine 44 usually has multiple combustion chambers 46.

Furthermore, FIG. 4 shows an injector 48 of an injection system which is associated with combustion chamber 46 of internal combustion engine 44 and injects a fuel quantity, which is set via control unit 40 by specifying an injection time, into this combustion chamber 46. The number of injectors 48 in an injection system usually corresponds to the number of combustion chambers 46 in internal combustion engine 44.

A engine speed sensor 50 situated on internal combustion engine 44 measures and detects a speed of internal combustion engine 44. A value of the speed is transmitted to control unit 40. Control unit 40 ascertains, usually by calculation, an angular velocity $d\phi/dt$ from the measured speed. Furthermore, control unit 40 calculates a speed-based feature of internal combustion engine 44, which represents a mechanical work of internal combustion engine 44 and is correlated with the indicated mean effective pressure. It is thus possible to control and/or to regulate an operation of internal combustion engine 44 and/or the injection system with the aid of control unit 42.

During a warm-up of internal combustion engine 44, control unit 40 usually ascertains the quantity of fuel to be injected via the speed-based feature of internal combustion engine 44. Accordingly, the quantity of injected fuel is set and/or regulated as a function of the speed-based feature. The speed-based feature is usually determined and the fuel quantity is ascertained therefrom. The speed-based feature represents a mechanical work of internal combustion engine 44 which is proportional to the square of angular velocity $d\phi/dt$ of the crankshaft or the crank drive, the feature being directly or indirectly ascertained by engine speed sensor 55 and possibly being a function of the speed and angular velocity dϕ/dt determinable therefrom. To determine the speed-based feature, e.g., the kinetic energy of rotation of the crankshaft or the crank drive, a tooth time or a segment time of the speed of the crankshaft or the crank drive of internal combustion engine 44 may be used. It is also possible to determine rotational angle ϕ or angular velocity dϕ/dt using a rotational angle sensor (not illustrated here).

As is shown in the diagram from FIG. 2, the speed-based feature is determined in one embodiment of the method according to the present invention, which may be carried out with the aid of system 42 schematically shown in FIG. 4 for different quantities of injected fuel to ascertain the ideal quantity, wherefrom characteristic 16 of the speed-based feature results over the injected quantity; the injected fuel quantity is ascertained as the ideal quantity at which the characteristic has kink 20. The quantity of fuel to be injected is generally incrementally, for example as indicated in the flow chart from FIG. 1, or, if necessary, constantly continuously increased to form characteristic 16 starting from an initial value for the quantity until characteristic 16 of the speed-based feature has kink 20. The quantity of injected fuel is varied by changing the injection time for injector 48. Kink 20 may be ascertained by checking the derivative of the characteristic. The diagram shows that the derivative of characteristic 16 is constantly greater than zero prior to kink 20 and equals zero starting from kink 20. Kink 20 in characteristic 16 is thus recognizable in that a value of the derivative of characteristic 16 reaches a threshold value which is zero in the present case.

The speed-based feature, which for example may be a function of angular velocity dϕ/dt and may be proportional to its square, generally rises linearly starting from the initial value for the quantity of fuel to be injected. As soon as kink 20 has been reached, the speed-based feature assumes a constant and maximum value. Accordingly, the speed-based feature reaches its maximum with kink 20 at least during the warm-up so that internal combustion engine 44 performs its maximum work. In the presence of and/or when kink 20 is reached, an ideal injection time 22 is reached during which an ideal fuel quantity is injected. A further increase in the injected quantity due to prolongation of the injection time would not result in an increase of the torque of internal combustion engine 44. Since the speed-based feature correlates with the mean effective pressure, a lambda value for exhaust gases of internal combustion engine 44 may be determined therefrom, which is otherwise not directly possible during the warm-up, since the lambda sensor necessary for this purpose is not functioning yet.

What is claimed is:

1. A method for operating an internal combustion engine, the method comprising:

determining, via a processor, a speed-based feature of the internal combustion engine, which is correlated with an indicated mean effective pressure of at least one combustion chamber, during the warm-up of the internal combustion engine; and ascertaining, via the processor, an ideal fuel quantity, which is to be injected into the at least one combustion chamber of the internal combustion engine during the warm-up of the internal combustion engine therefrom;

wherein the speed-based feature is determined for different quantities of injected fuel to ascertain the ideal quantity, wherefrom a characteristic of the speed-based feature results over the injected quantity, and wherein the injected fuel quantity is ascertained as the ideal quantity in which a value of a derivative of the characteristic corresponds to a threshold value.

2. The method of claim 1, wherein the speed-based feature is ascertained via at least one of a tooth time-based speed analysis and a segment time speed analysis of the speed of the internal combustion engine.

3. The method of claim 1, wherein the characteristic has a kink if the value of the derivative of the characteristic corresponds to the threshold value.

4. The method of claim 1, wherein the quantity of injected fuel is incrementally increased to form the characteristic.

5. The method of claim 1, wherein the quantity of injected fuel is varied due to a change in an injection time.

6. The method of claim 1, wherein to determine the speed-based feature, a speed of a crankshaft or a crank drive of the internal combustion engine is measured by an engine speed sensor of the internal combustion engine, wherein an angular velocity, which is coupled to the speed, is determined from the speed.

7. The method of claim 1, wherein a rotational angle or an angular velocity is determined by a rotational angle sensor, and wherein the speed-based feature is determined as a function of the angular velocity or the rotational angle.

8. The method of claim 1, wherein a previously applied value, which is a function of a load, including at least one of a speed, a temperature of the internal combustion engine, and a number of combustions since the end of a start is used as an initial value for a quantity to be injected.

9. A method for operating an internal combustion engine, the method comprising:

determining, via a processor, a speed-based feature of the internal combustion engine, which is correlated with an indicated mean effective pressure of at least one combustion chamber, during the warm-up of the internal combustion engine; and ascertaining, via the processor, an ideal fuel quantity, which is to be injected into the at least one combustion chamber of the internal combustion engine during the warm-up of the internal combustion engine therefrom;

wherein the speed-based feature represents a mechanical work of the internal combustion engine.

10. A method for operating an internal combustion engine, the method comprising:

determining, via a processor, a speed-based feature of the internal combustion engine, which is correlated with an indicated mean effective pressure of at least one combustion chamber the fuel, during the warm-up of the internal combustion engine; and ascertaining, via the processor, an ideal fuel quantity, which is to be injected into the at least one combustion chamber of the internal combustion engine during the warm-up of the internal combustion engine therefrom;

wherein a previously applied value, which is a function of at least one operating parameter of the internal combustion engine, is used as the initial value for the quantity of fuel to be injected.

11. The method of claim 10, wherein the initial value for a lean air/fuel mixture is set.

12. A system for operating an internal combustion engine, comprising:

a determining arrangement to determine, during a warm-up of the internal combustion engine, a speed-based feature of the internal combustion engine, which is correlated with an indicated mean effective pressure of at least one combustion chamber;

an ascertaining arrangement to ascertain therefrom an ideal fuel quantity, which is to be injected into the at least one combustion chamber of the internal combustion engine during the warm-up of the internal combustion engine; and injecting the ideal fuel quantity during the warm-up of the internal combustion engine;

wherein the speed-based feature is determined for different quantities of injected fuel to ascertain the ideal quantity, wherefrom a characteristic of the speed-based feature results over the injected quantity, and wherein the injected fuel quantity is ascertained as the ideal quantity in which a value of a derivative of the characteristic corresponds to a threshold value.

13. The system of claim 12, wherein the quantity of injected fuel is varied due to a change in an injection time.

14. The system of claim 12, wherein the speed-based feature represents a mechanical work of the internal combustion engine.

15. The system of claim 12, wherein the speed-based feature is ascertained via at least one of a tooth time-based speed analysis and a segment time speed analysis of the speed of the internal combustion engine.

16. The system of claim 12, wherein the characteristic has a kink if the value of the derivative of the characteristic corresponds to the threshold value, wherein the quantity of injected fuel is incrementally increased to form the characteristic, and wherein the quantity of injected fuel is varied due to a change in an injection time.

17. The system of claim 16, wherein the speed-based feature represents a mechanical work of the internal combustion engine.

18. The system of claim 16, wherein the speed-based feature is ascertained via at least one of a tooth time-based speed analysis and a segment time speed analysis of the speed of the internal combustion engine.

19. The system of claim 12, wherein to determine the speed-based feature, a speed of a crankshaft or a crank drive of the internal combustion engine is measured by an engine speed sensor of the internal combustion engine, wherein an angular velocity, which is coupled to the speed, is determined from the speed.

20. The system of claim 12, wherein a rotational angle or an angular velocity is determined by a rotational angle sensor, and wherein the speed-based feature is determined as a function of the angular velocity or the rotational angle.

21. The system of claim 12, wherein a previously applied value, which is a function of a load, including at least one of a speed, a temperature of the internal combustion engine, and a number of combustions since the end of a start is used as an initial value for a quantity to be injected.

22. The system of claim 12, wherein the characteristic has a kink if the value of the derivative of the characteristic corresponds to the threshold value.

23. The system of claim 12, wherein the quantity of injected fuel is incrementally increased to form the characteristic.

* * * * *